United States Patent [19]

Carr et al.

[11] Patent Number: 4,814,703

[45] Date of Patent: Mar. 21, 1989

[54] METHOD AND APPARATUS FOR GAP MEASUREMENT BETWEEN A GRAPHITE/EPOXY STRUCTURE AND A METALLIC MODEL

[75] Inventors: James R. Carr, Puyallup; Dennis P. Sarr, Kent, both of Wash.

[73] Assignee: The Boeing Company, Seattle, Wash.

[21] Appl. No.: 81,668

[22] Filed: Aug. 4, 1987

[51] Int. Cl.$^4$ .............. G01B 7/14; G01H 7/00; G01N 27/72; G01N 29/00

[52] U.S. Cl. .................. 324/207; 73/597; 324/226; 324/227; 324/229

[58] Field of Search ........ 324/207, 226, 227, 229–231; 73/597

[56] References Cited

U.S. PATENT DOCUMENTS

| | | | |
|---|---|---|---|
| 2,780,795 | 2/1957 | Ambrosio . | |
| 3,258,686 | 6/1966 | Selgin | 324/230 |
| 3,407,352 | 10/1968 | Smith | 324/230 |
| 3,450,985 | 6/1969 | Lorenzi et al. | 324/230 |
| 3,662,576 | 5/1972 | Girlatschek . | |
| 3,745,833 | 7/1973 | Armstrong . | |
| 3,815,016 | 6/1974 | Nix et al. | 324/230 X |
| 4,302,721 | 11/1981 | Urbanek et al. | 324/226 |
| 4,307,611 | 12/1981 | Opara | 73/597 |
| 4,418,574 | 12/1983 | Flournoy | 324/226 X |
| 4,449,411 | 5/1984 | Suhr et al. | 324/326 X |
| 4,555,698 | 11/1985 | Clark et al. . | |
| 4,570,486 | 2/1986 | Volkmann | 73/597 |
| 4,641,525 | 2/1987 | Merki | 324/226 X |

*Primary Examiner*—Gerard R. Strecker
*Attorney, Agent, or Firm*—Seed and Berry

[57] ABSTRACT

A sensor including an eddy current loop and an ultrasonic transducer transmitting along a common axis is placed against a second surface of a graphite/epoxy composite structure whose first surface has been formed over the surface of a steel model. The eddy current coil can produce a signal measuring the separation between the sensor and the surface of the steel model, and the ultrasonic transduer can produce a signal representing the thickness of the graphite/epoxy composite panel. The distance and thickness signals are passed to electrical circuitry that computes their difference and displays the calibrated result as a measure of the gap between the steel model and the graphite/epoxy tool.

8 Claims, 3 Drawing Sheets

METHOD AND APPARATUS FOR GAP MEASUREMENT BETWEEN A GRAPHITE/EPOXY STRUCTURE AND A METALLIC MODEL

DESCRIPTION

1. Technical Field

The present invention relates to a method and an apparatus for measuring the gap between a graphite/epoxy structure and a metallic model, and more particularly, to a method and an apparatus for simultaneously making an ultrasonic measurement of the thickness of a graphite/epoxy structure and an eddy current measurement of the distance to the surface of the metallic model and determining the difference between the measurements.

2. Background Art

In applications where a complementary part is made from a master model, it is typically of interest to determine how closely the part complies with the shape of the model. Manufacturing graphite/epoxy "tool" structures from a steel model is one example of such a situation. When a tool is made from a model, the tool to be used to produce other copies of the model, it is important to be able to adjust the tool at those points where its shape is not exactly that of the steel model. In order to know what adjustments to make, it is therefore necessary to measure the gap between the tool and the model.

A procedure for measuring the tool/model gap that is known in the prior art is: (1) to lift the tool away from the model and to insert a number of balls made from a pliable material, such as clay, in a small test area; (2) to cause the tool and the model to be brought into sufficiently close proximity that the clay balls are distorted to measure the gap between the tool and the model; (3) to again separate the tool and the model, and (4) to measure the gap thickness as recorded by the deformed thickness of the clay balls. This process is very time-consuming, as it must be done, one small section at a time, over the entire surface. In addition, these measurements may have to be repeated after adjustments have been made to the tool to ensure that the adjustments were adequate. Further, the need to handle the tool frequently increases the likelihood that the tool will be damaged and require expensive repairs.

In an alternative approach, it is known to make separate ultrasonic and eddy current measurements of the thickness of the graphite/epoxy tool and the distance to the model. From these two measurements it is possible to estimate the gap between the tool and the model. The ultrasonic and eddy current measurements must be made separately, making it possible that the two sets of measurements are not properly correlated and/or are not made at the same point. In addition, eddy current effects can be nonlinear, thereby causing the eddy current measurements to be inaccurate.

It is therefore desirable to develop a method and an apparatus for simultaneously making ultrasonic thickness measurements on the graphite/epoxy tool, eddy current measurements of the separation between a sensor and the metallic model, and electronicaly computing the difference between these two measurements.

DISCLOSURE OF THE INVENTION

It is an object of the present invention to simultaneously measure both the thickness of an electrically conductive model and the distance from the sensor to the metallic model, and to determine the size of the gap between the tool and the model electronically.

It is another object of the present invention to measure the tool/model gap at several points without having to separate the model and tool between measurements.

It is yet another object of the present invention to automatically compute the gap between the graphite/epoxy tool and the metallic model.

It is a further object of the present invention to provide an apparatus that indicates that the eddy current measurements are in a linear region.

In accordance with the objects given above, the present invention provides an apparatus that measures the gap between a point on the surface of an electrically conductive model and a point on a first surface of a composite structure, the first surface being proximate to the model surface. The composite structure has a second surface spaced away from the first surface. The apparatus comprises ultrasonic means for producing a signal representing the thickness of the composite structure from a point on the second surface to the point on the first surface. The point on the second surface coincides with the straight line passing through the point on the model surface and the point on the first surface of the composite structure.

The apparatus further comprises eddy current means for producing a signal representing the distance from the point on the second surface to the point on the model surface. Further, the apparatus comprises means for processing the signals representing the measurements of the composite structure thickness and the distance to the model shape, and producing a signal representing the measurement of the gap.

In further embodiments, the apparatus comprises means for displaying the signal representing the measurement of the gap.

In another aspect, the invention comprises a method for measuring a gap between a point on the surface of an electrically conductive model and a point on a first surface of a composite structure, the first surface being proximate to the model surface and the composite structure having a second surface spaced away from the first surface. The method comprises the steps of ultrasonically measuring the thickness of the composite structure and producing a signal representing the measured thickness between a point on the second surface and the point on the first surface, the point on the second surface coinciding with the straight line passing through the point on the model surface and the point on the first surface on the composite structure. The method also comprises the step of making an eddy current measurement for producing a signal representing the distance from the point on the second surface to the point on the model surface. The method then comprises the step of processing the signals representing the measurements of the composite structure thickness and the distance to the model shape, and producing a signal representing the measurement of the gap.

In a further embodiment, the method can further comprise the step of displaying the signal representing the measurement of the gap.

BEST MODE FOR CARRYING OUT THE INVENTION

Figure 1:
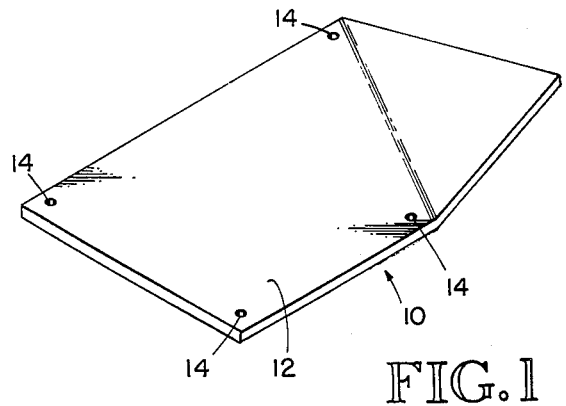
FIG. 1 is an isometric view of a steel model.

FIG. 1 is an isometric view of a typical model 10 of a part that is to be reproduced in quantity. An example of an application requiring such a model is the production of graphite/epoxy composite parts for use in aircraft, where it is intended that many copies, substantially identical to model 10, will be produced. In order to accomplish this goal, several copies of a shape (i.e., a "tool") will be produced. The desired graphite/epoxy composite parts can then be made through a molding process from the tools.

In many applications, that of making graphite/epoxy parts for aircraft included, it is important that the resulting parts be very closely compliant to the shape of model 10. Model 10 is, itself, made to very close tolerances, as it is typically made from steel by a numerically controlled milling machine. While other materials can be substituted for steel in model 10, it is important that the surface 12 be susceptible to the generation of eddy currents under the influence of an alternating magnetic field. When made from steel, model 10 is typically between one-half to one inch thick.

To preserve its shape, model 10, which can be virtually any size, ranging from dimensions of only a few inches to dimensions of many tens of feet, is supported by a very stable framework (not shown). This framework allows model 10 to retain the tolerances on its shape even when it is supported in an inverted position and, when equipped with wheels, allows for easy transport of the model to a storage location.

Surface 12 of model 10 typically includes a portion containing the critical shape and another portion whose shape is not critical. The non-critical portion is reserved to allow the panel to be conveniently handled. Among other things, in this non-critical area of surface 12, several index holes 14 can be formed. These index holes can be fitted with small rod-like projections when a tool is being made from the model, in order to provide a convenient means of indexing the tool to the model.

Figure 2:
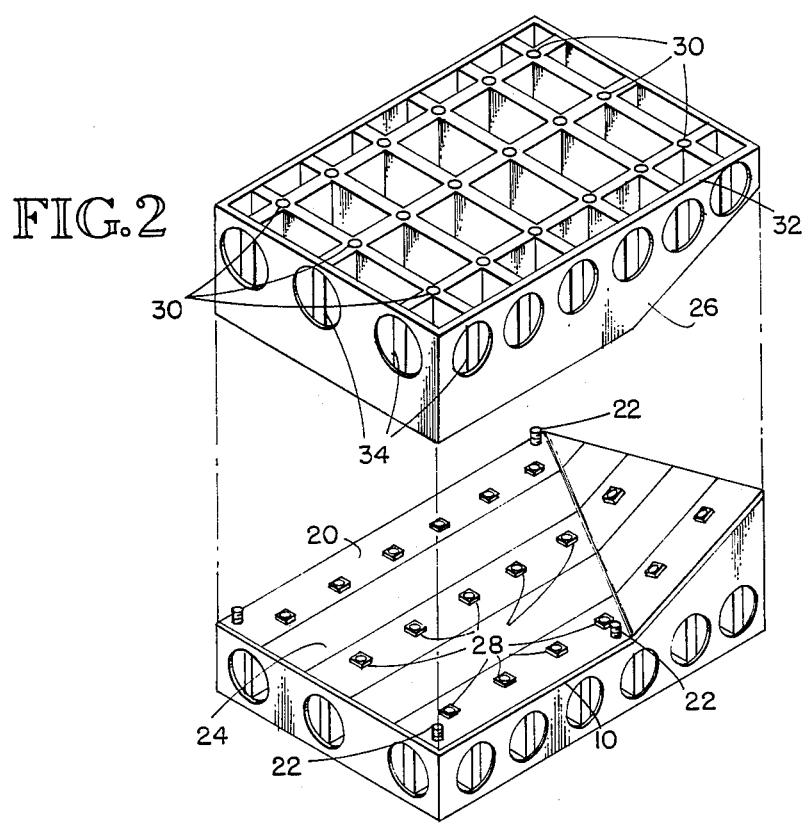
FIG. 2 is an isometric view showing the step of forming a graphite/epoxy tool from the steel model of FIG. 1.

FIG. 2 is an isometric view of the step of manufacturing tool 20 over surface 12 of model 10. To preserve the indexing between tool 20 and model 10, rods 22 were inserted into index holes 14 of model 10 before the process of "laying up" tool 20 was started. In addition, in some applications, it may be desirable to place a release agent over surface 12 so that tool 20 will readily separate from model 10 after all the manufacturing steps needed to make model 10 have been completed. Tool 20 can be made from "prepreg" fabric, e.g., carbon fiber fabric that has been preimpregnated with an epoxy resin. Alternatively, at least for the first few layers, tool 20 can be made from graphite fiber "prepreg" tapes. The process of adding layers of fabric or tape to tool 20 continues until the tool has reached an appreciable thickness, i.e., ¾ to one inch thick. The "prepreg" then cures to form a surface whose shape is compliant to that of model 10.

The parts that are to be produced from tool 20 are typically created in an autoclave at a temperature of approximately 350° F., with a part-to-tool pressure in the range of 40 to 80 psi being applied. Therefore, to preserve the shape compliance between tool 20 and parts to be subsequently made from it, it is mandatory that tool 20 be made from material whose thermal coefficient of expansion is very close to that of the material from which the parts themselves are made. In an application where the parts are to be made from graphite/epoxy composite, it is therefore advantageous to make the tool 20 from a graphite/epoxy composite material.

The possible difference in thermal coefficient of expansion between model 10 and tool 20 is not considered critical, because tool 20 will later be added to a base made from "egg crate", which provides for making adjustments to the tool's shape. Therefore, in the process of curing tool 20, it is expected and is commonly the case that tool 20, when reduced to room temperature, will have a slightly different shape than that of model 10. Thus, it is important to be able to measure those areas where there is a discrepancy in the shape between model 10 and tool 20 and to be able to adjust the shape of tool 20 in order to bring their surfaces into close compliance.

In order to make it possible to adjust tool 20, before it has cured, its second surface, or undersurface, 24 has screw adjustment fixtures installed and an egg crate base 26 affixed. Adjustment pads 28 are placed on undersurface 24 to coincide with crossover points 30 of egg crate base 26. After egg crate base 26 has been attached to tool 20, the combination is turned over, allowing it to be supported on egg crate support surface 32. Egg crate base 26 also has a series of access ports 34 through which fine adjustments of the surface of tool 20 can be accomplished.

Figure 3A:
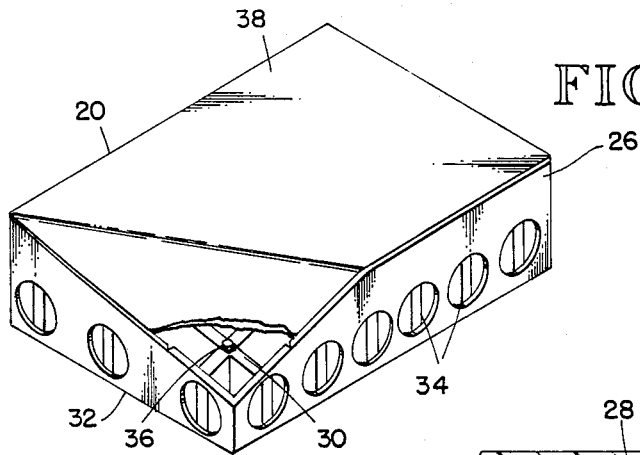
FIG. 3A is an isometric cutaway view of the adjustment mechanism of the graphite/epoxy tool of FIG. 2.
Figure 3B:
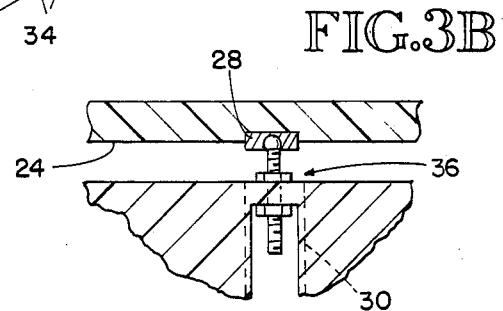
FIG. 3B is a close-up view in partial cross-section of the adjustment mechanism.

FIG. 3A of the drawings is an isometric view of egg crate base 26 as it would be positioned when tool 20 is being used to make graphite/epoxy structures. That is, an adjustment mechanism 36 which mates with the corresponding adjustment pad 28 is supported at each egg crate crossover point 30. FIG. 3B is a close-up view in partial cross-section of the adjustment mechanism. Adjustment mechanism 36 permits the localized movement of the surface of tool 20 by adjusting the separation between corresponding crossover point 30 and the portion of undersurface 24 of tool 20 to which a corresponding adjustment pad 28 is attached. Adjustment mechanism 36 can, for example, be an adjustable, lockable bolt that passes through a nut attached to crossover point 30. Access to the individual adjustment mechanisms 36 is possible through either an access port 34 or support surface 32.

In use, working surface 38 of tool 20 will be laid over by an appropriate material, such as a graphite/epoxy-preimpregnated tape to create the desired part. It may be necessary to apply a release agent to working surface 38 to prevent the part from adhering to tool 20. After working surface 38 of tool 20 has been adjusted to its final shape, indexing rod 22 is no longer required. Before the part that is being formed over tool 20 has hardened, its density can be increased (i.e., the part can be compacted) by placing a sheet, such as a plastic sheet, over the laid-up tape which is in place over working surface 38 of tool 20. Vacuum probes can be inserted through the sheet and a vacuum applied, by using the pressure in the autoclave where the tool and forming part are placed to both compress the part and remove gases that are produced as the epoxy sets. The similarity in thermal coefficient of expansion of tool 20 and the laid-up part ensures that, as the tool and part are subjected to varying temperatures, they will expand and contract together, ensuring that the final shape of the part being formed exactly complements that of tool 20.

It is critically important, therefore, that the shape of working surface 38 of tool 20 be perfectly matched to surface 12 of model 10. It can be expected that, after the epoxy of tool 20 has set, the shapes of tool 20 and model 10 will be slightly different because of their different thermal coefficients of expansion. A convenient means for measuring how closely tool 20 and model 10 match is to measure the gap between them. This gap is relatively small compared to the size and thickness of the tool, often being measured in thousandths of an inch (mils). If the gap between the tool and the model is uniform, the user can be assured that parts made from the tool will accurately represent the shape of model 10. The method and apparatus of the present invention make these measurements in a particularly convenient manner, without necessitating that tool 20 and model 10 be separated, for example, to measure the compressed thickness of an array of clay balls.

Figure 4:
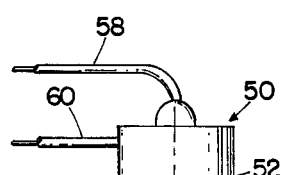
FIG. 4 is a schematic view of the orientation of the sensor of the present invention while it is being used to make simultaneous ultrasonic and eddy current measurements.

FIG. 4 is a schematic diagram of the sensor of the present invention in use with a steel model 10 and a graphite/epoxy tool 20. The configuration of model 10 and tool 20 is depicted as it would be after tool 20 has been formed over model 10, but before they have been separated so that tool 20 can be used to create graphite/epoxy copies of model 10. In this configuration, surface 12 of model 10 can be seen to face a first surface, working surface 38, of tool 20, while a second surface, undersurface 24, is the opposing surface of tool 20. The thickness of tool 20, near the location of sensor 50, as measured along the straight line 52 passing through point 55 on undersurface 24 and point 56 on the first surface (i.e., working surface) 38 is designated by u. The separation along the straight line 52 between surface 24 and point 54 is designated by E. Therefore, the gap between points 54 and 56, designated by G, is given by the formula $G = E - u$.

Sensor 50 is capable of measuring distance u ultrasonically and distance E through an eddy current measurement in a manner to be explained with reference to FIG. 5. Additional electronic circuitry (to be explained subsequently) receives the ultrasonic and eddy current measurement signals through cables 58 and 60, respectively.

Figure 5:
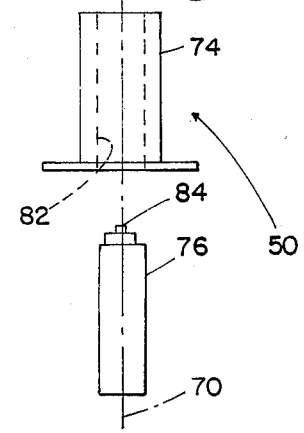
FIG. 5 is an exploded elevational view of the ultrasonic/eddy current sensor of FIG. 4.

FIG. 5 is an exploded elevational view of sensor 50, showing its important component parts. Sensor 50 is symmetric about axis 70 and comprises three component parts. These parts are eddy current coil 72, spacer 74, and ultrasonic transducer 76. Eddy current coil 72 can, for example, be part no. LRO 212-1, made by N.D.T. Product Engineering of Long Beach, Calif. Eddy current coil 72 comprises a coil of wire, connected through cable 60, which induces eddy currents in a nearby conductive material. These eddy currents, in turn, induce a "back electromotive force (EMF)' through the mutual inductive effects between coil 72 and the nearby conductive material. This back EMF can be sensed by circuitry, and its strength can be uniquely related to the distance between the lower surface 78 of eddy current coil 72 and the closest surface of the conducting sheet, as measured along axis 70. The outer dimensions of sensor 50 are those of a cylinder whose axial length is approximately 1⅜" and whose diameter is approximately 1⅛". This sensor is, therefore, conveniently held in a person's hand and easily brought against undersurface 24 of tool 20 (see FIG. 4). Spacer 74 can be made, for example, from a plastic such as Lucite ®. Spacer 74 is a cylindrical shell, adapted to fit closely within axial cylindrical hole 80. Spacer 74 itself has an axial cylindrical hole 82. Ultrasonic transducer 76 is of a cylindrical shape and fits very closely within cylindrical hole 82. Ultrasonic transducer 76 can, for example, operate at a frequency of 2.25 MHz. Such a transducer is part no. 2910457, made by K.B. Aerotech. Electrical connection to ultrasonic transducer 76 is made by signal cable 58 (see FIG. 4) at connector 84.

In operation, signals sent to eddy current coil 72 through signal cable 60 produce a magnetic field which passes essentially unattenuated through the graphite/epoxy tool 20 and induces eddy currents within model 10. The EMF produced by these eddy currents affects magnetic coupling between eddy current coils 72 and model 10, an effect which can be calibrated as a function of separation between lower surface 78 of sensor 50 and conductive surface 12 of model 10. By appropriately calibrating electronic circuitry which will be described subsequently, an electrical signal representative of distance between sensor 50 and model 10 can be generated.

Likewise, ultrasonic transducer 76 can be used to measure the round-trip transit time of ultrasonic pulses from undersurface 24 to working surface 38 and back to undersurface 24. Based on the speed of sound through the graphite/epoxy composition comprising tool 20, the time of flight can be calibrated to represent thickness dimension U.

Figure 6:
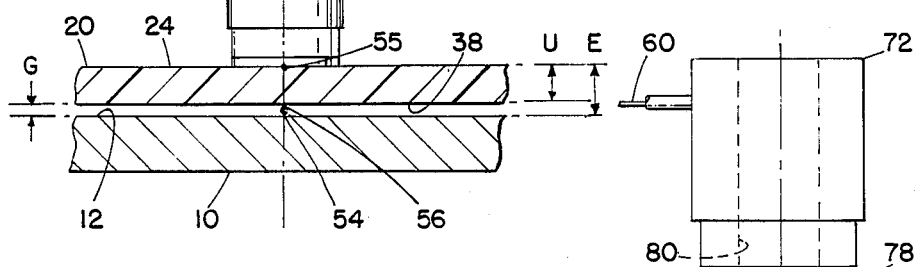
FIG. 6 is a schematic diagram of the organization of the components of the apparatus of the present invention.
Figure 6:
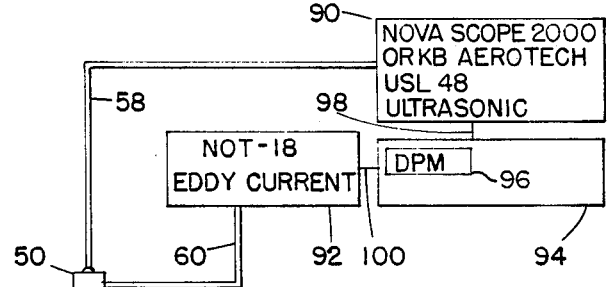

FIG. 6 is a schematic view showing sensor 50 connected to a conventional ultrasonic signal processor 90, and to a conventional eddy current signal processor 92 through signal cables 58 and 60, respectively. Signal processors 90 and 92 generate signals representative of the tool thickness and steel model separation distance, respectively, and send these signals to circuit 94, including digital panel meter (DPM) 96, over signal lines 98 and 100, respectively.

Figure 7:
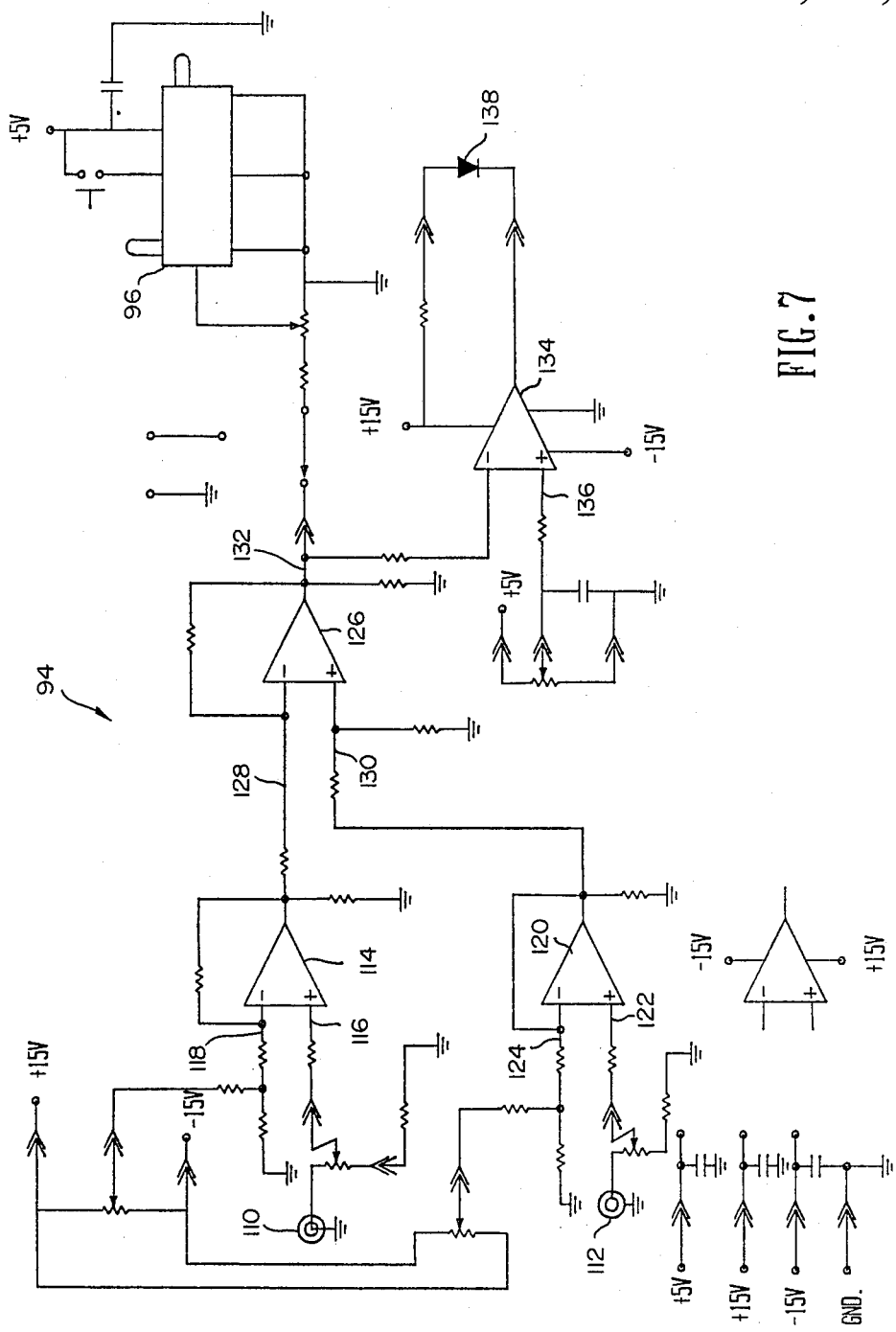
FIG. 7 is a schematic diagram of the electrical circuitry of the signal processing means of the present invention.

FIG. 7 is a schematic diagram of the electrical circuitry contained in circuit 94. Ultrasonic signal line 98 is connected to the circuitry and input jack 110, while the eddy current signal line 100 is connected to circuit 94 at eddy current input jack 112. Amplifier 114 receives the ultrasonic signal through input jack 110 at input 116 and also receives an offset signal at input 118. The offset signal accounts for the time delay of the pulse produced by ultrasonic transducer 76. The gain of amplifier 114 is adjusted to calibrate its output signal.

Amplifier 120 receives the eddy current signal from input jack 112 on input 122 and an offset signal on input 124. Amplifiers 120 and 114 are calibrated so the same change in signal by either amplifier corresponds to the same change in the distances they respectively measure.

The signals are sent to amplifier 126, which subtracts the signal representing the thickness of the graphite/epoxy tool (on line 128) from the signal representing separation between the sensor and the model (on line 130). Amplifier 126 is calibrated so that its output signal, on line 132, represents the gap in mils. This signal is sent to digital panel meter 96. Digital panel meter 96 can be a model no. DW-3100N, made by Datel.

To preserve accuracy, it is important that eddy current coil 72 (in FIG. 5) be operated in its linear region. Accordingly, the signal on line 132 is tested to see whether it exceeds a preestablished voltage level that indicates that the eddy current sensor is operating in its nonlinear region. Amplifier 134 compares the signal on line 132 with a reference signal at input 136 and produces an output voltage whenever the voltage on line 132 exceeds the threshold voltage on input 136. This output voltage causes light-emitting diode (LED) 138 to light up, indicating to the user that the eddy current sensor may be operating outside of its linear region.

While the preferred embodiment has been disclosed in terms of its use with a steel model and a tool made from graphite/epoxy, it will be apparent to those skilled in the art that model 10 can be made from any material in which eddy current measurements are possible and tool 20 can be made from any composition that does not strongly affect the magnetic field produced by eddy current coil 72. In particular, the materials used to make tool 20 can be a thermoplastic material rather than a thermosetting resin. In this case, it will be possible to adjust the shape of tool 20 through some mechanism other than the adjusting mechanism 36. For example, in the case of thermoplastics, the adjustment can be made by reheating and reshaping tool 20.

In addition, although the preferred embodiment was disclosed in terms of its use with panels, it will be equally effective when used with other composite structures having first and second surfaces. In any case, it is not necessary that the method and apparatus of the present invention be used to ensure that a uniform gap exists between a model and a composite structure. Rather, the method and tool of the present invention can be used to cause the separation between the model and composite structure to follow some predetermined shape.

While it is particularly advantageous to present the gap measurement on a digital display that is calibrated to read directly in terms of meaningful distances, those skilled in the art will appreciate that the signal can be calibrated to any desired measurement and displayed in any desired manner.

The apparatus of the present invention is easily calibrated, for example, when using the tool with a different graphite/epoxy composition, by using it to measure the thickness of a premeasured sample of the new composition. In addition, the eddy current measurements can be calibrated through the use of a standardized fixture whose critical dimensions are known.

Finally, it will be apparent to those skilled in the art that various modifications of the present method and apparatus may be made without departing from its spirit and scope. In particular, the circuitry of the present invention can be realized by properly interfacing the output of the ultrasonic and eddy current sensors to a microprocessor that can be programmed to account for a variety of calibration standards, composite compositions, and nonlinearities in eddy current measurements.

We claim:

1. An apparatus for measuring a gap between a point on the surface of an electrically conductive model and a point on a first surface of a composite structure, the first surface being proximate to the model surface, the composite structure having a second surface spaced away from the first surface, the apparatus comprising:
    ultrasonic means for producing a signal representing the thickness of the composite structure, from a point on the second surface to the point on the first surface, the point on the second surface coinciding with the straight line passing through the said point on the model surface and the said point on the first surface of the composite structure, said ultrasonic means being adapted for placement in proximity to said second surface;
    eddy current means for producing a signal representing the distance from the said point on the second surface to the said point on the model surface, the eddy current means being held in fixed relationship with said ultrasonic means and adapted for placement in proximity to said second surface and producing the signal representing the distance at the same time that the ultrasonic means produces the signal representing the thickness; and
    means for processing the signals representing the measurements of the composite structure thickness and the distance to the model surface and producing a signal representing the measurement of the gap.

2. The apparatus of claim 1, including means for displaying the signal representing the measurement of the gap.

3. The apparatus of claim 1 wherein the ultrasonic means and eddy current means are combined in a single hand-held unit.

4. An apparatus for measuring a gap between a point on the surface of an electricaly conductive model and a point on a first surface of a composite structure, the first surface being proximate to the model surface, the composite structure having a second surface spaced away from the first surface, the apparatus comprising:
    a sensor having a predetermined axis, the sensor including:
        ultrasonic means for producing a signal representing the thickness of the composite structure, along the axis of the sensor, from a point on the second surface to the point on the first surface, said ultrasonic means being adapted for placement in proximity to said second surface, and
        eddy current means for producing a signal representing the distance along the axis from the said point on the second surface to the said point on the model surface, said eddy current means being held in fixed relationship with said ultrasonic means and adapted for placement in proximity to said second surface; and
    means for processing the signals representing the measurements along the sensor axis of the composite structure thickness and the distance to the model surface and producing a signal representing the measurement of the gap.

5. The apparatus of claim 4, including means for displaying the signal representing the measurement of the gap.

6. The apparatus of claim 5 wherein the means for displaying the signal representing the measurement of the gap is a digital panel meter.

7. A method for measuring a gap between a point on the surface of an electrically conductive model and a point on a first surface of a composite structure, the first surface being proximate to the model surface, the composite structure having a second surface spaced away from the first surface, the method comprising the steps of:

produshing a signal representing an ultrasonic measurement of the thickness of the composite structure from a point on the second surface to the point on the first surface, the point on the second surface coinciding with a straight line passing through the said point on the model surface and the said point on the first surface of the composite structure;

producing a signal representing an eddy current measurement of the distance from the said point on the second surface to the said point on the model surface; and processing the signals representing the measurements of the composite structure thickness and the distance to the model surface and producing a signal representing the measurement of the gap.

8. The method of claim 7, further comprising the step of displaying the signal representing the measurement of the gap.

* * * * *